(12) United States Patent
Harding

(10) Patent No.: US 8,390,145 B2
(45) Date of Patent: Mar. 5, 2013

(54) BATTERY ISOLATOR UNIT

(75) Inventor: John Wayne Harding, Morphett Vale (AU)

(73) Assignee: Redarc Technologies Pty Ltd, South Australia (AU)

( * ) Notice: Subject to any disclaimer, the term of this patent is extended or adjusted under 35 U.S.C. 154(b) by 605 days.

(21) Appl. No.: 12/628,277

(22) Filed: Dec. 1, 2009

(65) Prior Publication Data

US 2011/0127830 A1 Jun. 2, 2011

(51) Int. Cl.
*B60L 1/00* (2006.01)

(52) U.S. Cl. ....... 307/9.1; 307/10.1; 307/10.7; 320/103; 320/104; 320/162; 320/163; 320/164

(58) Field of Classification Search ............ 307/9.1, 307/10.1, 10.7; 320/103–104, 117, 126, 320/128, 135, 145, 152, 157–159, 162–164
See application file for complete search history.

(56) References Cited

U.S. PATENT DOCUMENTS

| | | | | |
|---|---|---|---|---|
| 5,162,720 A * | 11/1992 | Lambert | | 320/104 |
| 5,264,777 A * | 11/1993 | Smead | | 320/126 |
| 5,808,444 A * | 9/1998 | Saeki et al. | | 320/117 |
| 5,844,325 A * | 12/1998 | Waugh et al. | | 307/10.7 |
| 6,008,629 A * | 12/1999 | Saeki et al. | | 320/140 |
| 6,229,287 B1 * | 5/2001 | Ferris et al. | | 320/141 |
| 6,265,847 B1 * | 7/2001 | Goerke | | 320/126 |
| 6,342,775 B1 * | 1/2002 | Sleder, Sr. | | 320/116 |
| 6,466,024 B1 * | 10/2002 | Rogers | | 324/427 |
| 6,487,670 B1 * | 11/2002 | Racino et al. | | 713/340 |
| 6,838,858 B2 * | 1/2005 | Berneis et al. | | 320/135 |
| RE40,820 E * | 7/2009 | Rogers | | 324/427 |
| 7,567,057 B2 * | 7/2009 | Elder et al. | | 320/104 |
| 7,656,118 B2 * | 2/2010 | Krieger et al. | | 320/105 |
| 7,898,110 B2 * | 3/2011 | Song | | 307/66 |
| 8,076,794 B2 * | 12/2011 | Proebstle et al. | | 307/9.1 |
| 2002/0195995 A1 * | 12/2002 | Cook et al. | | 320/117 |
| 2003/0085689 A1 * | 5/2003 | Berneis et al. | | 320/135 |
| 2005/0151508 A1 * | 7/2005 | Cook et al. | | 320/116 |
| 2007/0188967 A1 * | 8/2007 | Smith et al. | | 361/155 |
| 2008/0036419 A1 * | 2/2008 | Cook et al. | | 320/104 |
| 2008/0238207 A1 * | 10/2008 | Kim et al. | | 307/71 |
| 2008/0276892 A1 * | 11/2008 | Doljack | | 123/179.28 |
| 2010/0141210 A1 * | 6/2010 | Shaffer, Jr. | | 320/126 |
| 2011/0001354 A1 * | 1/2011 | Lindstrom | | 307/9.1 |
| 2011/0084647 A1 * | 4/2011 | Haines | | 320/101 |
| 2011/0128153 A1 * | 6/2011 | Sims et al. | | 340/636.1 |

* cited by examiner

*Primary Examiner* — Jared Fureman
*Assistant Examiner* — Alfonso Perez Borroto
(74) *Attorney, Agent, or Firm* — Carmody & Torrance LLP

(57) ABSTRACT

A battery isolator unit is disclosed for controlling a switching means having a first contact for connection to a terminal of a first battery, a second contact for connection to a corresponding terminal of a second battery, and an actuating input for biasing a switch element of the switching means switch in a closed position. The battery isolator unit includes a sensing circuit and a switch controller. The sensing circuit periodically determines a first and second value attributable to terminal voltage values of the first battery and the second battery respectively. The switch controller is responsive to detecting a predetermined condition of the first battery and/or the second battery to provide to the actuating input a control signal having a characteristic for biasing the switch element to the closed position. The switch controller periodically determines a difference between the first and second values when the switch element is in the closed position to obtain a obtain a sequence of difference values, and controls the characteristic of the control signal according to a comparison of a present difference value with a previous difference value to modify the bias of the switch element.

27 Claims, 5 Drawing Sheets

BATTERY ISOLATOR UNIT

FIELD OF INVENTION

The present invention relates generally to a method and a system for battery isolation. An embodiment of the present invention may be used, for example, in an automotive vehicle.

BACKGROUND OF THE INVENTION

In recent years, automotive vehicles, such as recreational four-wheel drive vehicles, have becoming increasingly sophisticated in terms of the type and number of electrical accessories which are either fitted to the vehicle as original equipment manufacturer (OEM) items or installed as after market accessories. For example, four-wheel drive vehicles may be fitted with HF radios, winches, refrigerators, GPS navigational systems, and high powered external lights. Although such accessories (or loads) are not usually essential to the operation of the vehicle, they nevertheless increase the electrical load which is placed on the primary electrical power source of the vehicle, and may require electrical power to operate when the vehicle is not operating.

In a conventional automotive vehicle, the primary source of electrical power may include a single lead-acid battery which supplies power to the vehicle's essential electrical systems (including the starting system) and the accessories. In such circumstances, when the vehicle is not operating, and thus when the battery is not being recharged by the vehicle's battery charging system, operating the accessories may inadvertently drain or discharge the battery and leave insufficient charge for the battery to start the vehicle.

One attempt to provide increased supply capacity involves installing multiple batteries (which may include a main battery and one or more auxiliary batteries) which are connected in a parallel circuit by operating a switch when additional capacity is required for starting the vehicle or operating an accessory. However, such an arrangement requires user intervention and may result in both batteries being discharged if the user fails to disengage the switch after use.

Another attempt to provide increased supply capacity involves providing a battery isolation unit which maintains a main battery and one or more auxiliary batteries in a parallel circuit unless the terminal voltage of the primary battery falls below a predetermined level. If the terminal voltage of primary battery, and thus the charge of the battery, does fall below the predetermined level, the battery isolation unit then operates to isolate the main battery from the electrical load to thereby preserve sufficient charge to start the vehicle. Existing battery isolation units may include a solenoid which incorporates a magnetically operated switch which is held in a closed position by maintaining an inductor or coil in an energised state. In the closed state the switch completes the parallel circuit between the main battery and one or more auxiliary batteries.

Unfortunately, in existing battery isolation units the current (and thus power) required to maintain the inductor or coil in an energised state may contribute to self-heating of the solenoid and thus of the battery isolation unit. In extreme cases, the self-heating may lead to adversely effect the reliability of the battery isolation unit, or at least decrease its service life. In addition, the current required to maintain the inductor or coil in an energised state depletes the available capacity of the battery.

It would be desirable to provide a battery isolation unit which provides reduced self heating effects. It would also be desirable to provide a battery isolation unit which provides a reduced power consumption.

SUMMARY OF THE INVENTION

According to one aspect of the present invention, there is provided a battery isolator unit for controlling a switching means having a first contact for electrical connection to a terminal of a first battery, a second contact for electrical connection to a corresponding terminal of a second battery, and an actuating input for biasing a switch element of the switching means to a closed position to connect the first contact to the second contact, the battery isolator unit including:

a sensing circuit for periodically determining a first and second value attributable to terminal voltage values of the first battery and the second battery respectively; and a switch controller responsive to detecting a predetermined condition of the first battery and/or the second battery to provide to the actuating input a control signal having a characteristic for biasing the switch element to the closed position;

wherein the switch controller periodically determines a difference between the first and second values when the switch element is in the closed position to obtain a sequence of difference values, and controls the characteristic of the control signal according to a comparison of a present difference value with a previous difference value to modify the bias of the switch element.

In one embodiment, the switching means and the battery isolator unit form a single or integrated module. The switching means may include a solenoid, contactor or a relay. It is envisaged that a battery isolator unit which includes the switching means may provide a more compact arrangement. However, it is possible that the switching means and the battery isolator may be separate modules, in which case the battery isolator unit may be adapted for communication with the switching means via a suitable switch interface. A suitable switching means interface may include a first input terminal adapted for communication with the terminal of the first battery and a second input terminal adapted for communication with the corresponding terminal of the second battery.

It will be appreciated that a switching means such as a solenoid, contactor or relay will include a magnetically operated switch element, such as an armature, and a coil which is "driven" or "energised" to provide a magnetic field for biasing the armature to an actuated position, which may be a closed position or an open position depending on the configuration of the switching means. In the present case, in the actuated position the armature electrically connects the first contact and the second contact of the switching means. Hence, embodiments of the present invention either include, or are adapted for use with, a "normally open" switch element, and the closed position is thus the actuated position.

It will also be appreciated that the coil of a solenoid, contactor or relay may require a minimum level of energisation, which may be expressed in terms of a "switching-on current" or an "actuating current", to operate or bias the armature to the actuated position. Once actuated, the armature will remain biased in the actuated position provided that a value of "holding current", which can be less than the "switching-on current", flows through the coil. When the current through the coil falls below the holding current, the coil is insufficiently driven or energised to provide a minimum holding force required to bias or hold the armature in the actuated position and thus the armature returns to the non-actuated position.

In view of the above, it will be appreciated that references throughout this specification to the term "bias" denote the extent to which the switching means is actuated to hold the switch element in the actuated position. In a switching means such as a coil of a solenoid, contactor or relay, the bias may be expressed in absolute or relative terms, such as in terms of the energisation of the coil, the coil current, or the holding force of the armature.

In use, the first battery may comprise a main or starting battery of an automotive vehicle whereas the second battery may comprise an auxiliary or back-up battery of the automotive vehicle. When the switch element is in the closed position the first and second batteries are connected in a parallel circuit configuration for connection to an electrical load.

The first and second batteries will each include a positive polarity terminal providing a positive output voltage and a negative polarity (or common) terminal which may be a grounded terminal. Preferably, the corresponding terminals of the first and second battery for electrical connection to the respective contacts of the switching means are the positive terminal of the first and second battery. However, it is also possible that the corresponding terminals may be negative terminals.

The sensing circuit may include an analog-to-digital converter (ADC) adapted to convert input voltage values attributable to the terminal voltage of the first battery and the terminal voltage of the second battery respectively to provide the first and second values as scaled data values. For example, the first and second values may be expressed as an n-bit code, such as an 8-bit code, encoding a voltage range of 0 to 20 VDC. It will be appreciated that the terminal voltage of the first battery and the terminal voltage of the second battery may be fed to a voltage divider network or similar arrangement to limit the input voltage values to fall within a range which is compatible with the input voltage requirements of the ADC.

The first and second values may be determined by sensing a single terminal voltage value attributable to the first and second battery respectively. Indeed, in an embodiment the first and second values include values which are indicative of the terminal voltage of the first battery and the terminal voltage of the second battery. In another embodiment, the first and second values include voltage values which are indicative of the voltage at the first contact and the voltage at the second contact respectively, each of which is attributable to the terminal voltage value of the first and second battery respectively, but may be a different value therefrom.

The first and second values may be determined by sensing N values over a time period T, the N values comprising N/2 voltage values attributable to the terminal voltage of the first battery and N/2 voltage values attributable to the terminal voltage of the second battery, and processing those values to determine the first and second value. Processing the N sensed values may involve determining the first value as a statistical value derived from at least some of the N/2 sensed values attributable to the terminal voltage of the first battery and determining the second value as a statistical value derived from at least some of the N/2 the sensed values attributable to the terminal voltage of the second battery.

The statistical value may include a statistical mean (or average) value, a median value, or a percentile value. Thus in one embodiment, the first value may be the statistical mean or average of voltage values attributable to the terminal voltage of the first battery acquired over the time period T, and the second value may be the statistical mean or average of voltage values attributable to the terminal voltage of the second battery acquired over the same time period T.

In an embodiment N=12 and T=1 mS. However, it will be appreciated that other time periods T and sample sizes N may be used.

In one embodiment, sensing the N values over a time period T involves a sensing process which acquires plural first voltage values and plural second voltage values over the time period T to form plural "interleaved" voltage values. In other words, in one embodiment the sensing circuit performs plural sensing operations or cycles over the time period T. Each sensing operation or cycle preferably involves consecutively sensing the first voltage values and the second voltage values. The plural sensing operations or cycles may provide a time-ordered sequence of plural sensed voltages comprising the first voltage values and the second voltage values. Any suitable sensing operation or cycle may be performed. In one embodiment, six sensing operations or cycles are performed over a 1 mS time period to provide twelve sensed voltage values.

Determining the first value as a statistical value derived from plural sensed values attributable to the terminal voltage of the first battery and the second value as a statistical value derived from plural sensed values attributable to the terminal voltage may involve any suitable process. One suitable process may involve identifying the maximum and minimum sensed voltage values of the first voltage values and the maximum and minimum sensed voltage values of the second voltage values of the plural sensed values. The first value may then be determined as a statistical value, such as a mean or average value, derived from the first voltage values falling between the maximum and minimum sensed voltage values of the first voltage values, and the second value may be determined as a statistical value, such as a mean or average value, derived the statistical value derived from the plural second voltage values falling between the maximum and minimum sensed voltage values of the second voltage values. It will be appreciated that other suitable statistical processes may be used.

The switch controller may include a programmed digital logic device, such as a microprocessor or microcontroller equipped with a suitable set of program instructions in the form of a computer program which are executable by the switch controller.

In an embodiment, the predetermined condition of the first battery may be a condition which indicates that the terminal voltage of the first battery exceeds a predetermined voltage value. The predetermined condition may be detected by processing the first value, or a time-ordered set of the first values. However, it is possible that the predetermined condition may be detected using a different value to the first value, but which is nevertheless a value which is also attributable to the terminal voltage of the first battery. For example, the predetermined condition of the first battery may be detected by acquiring and processing a single voltage value indicative of the terminal voltage of the first battery.

The predetermined value of the terminal voltage of the first battery may include a threshold value of voltage indicative of a state of charge level of the first battery. The state of charge level may be a level which has been determined as a sufficient charge for starting the automotive vehicle.

In an embodiment, the predetermined condition of the second battery may be a condition which indicates that the terminal voltage of the second battery exceeds a predetermined voltage value. The predetermined condition of the second battery may be the same predetermined condition as, or a different predetermined condition to, the predetermined condition of the first battery. For example, in one embodiment the predetermined condition of the first battery is a condition which indicates that the output voltage of the first battery exceeds a predetermined voltage value indicative of the first battery having a minimum acceptable state of charge, whereas the predetermined condition of the second battery is a condition which indicates that the terminal voltage of the second battery exceeds a predetermined voltage value indicative of a safe operating level.

The control signal is preferably a pulse width modulated (PWM) signal. In an embodiment, the characteristic of the control signal is a duty-cycle characteristic. Preferably, the control signal has an initial duty cycle in the form of a fixed value or constant duty cycle having a predetermined duration $T1$ for closing the switch element. The constant duty cycle may be a duty cycle of 100%. In another embodiment, the initial duty cycle depends on the first and/or second value. For example, the initial duty cycle may include a time varying duty cycle which provides an initial duty cycle value of 100% for a first time period $T1$, and which then decreases over a second time period $T2$ to a duty cycle value which depends on the first value and/or the second value. Hence, the initial duty cycle may include a duty cycle characteristic which provides a first fixed or constant value for a first predetermined period of time and a second or "base" duty cycle value for a second period of time. In an embodiment, the second or base duty cycle value depends on the first and/or second value. For example, the base duty cycle value may be set based on the maximum value of the first and/or second value.

Determining the difference between the first and second values may include determining a difference between statistically derived first and second values determined for a set of N sensed values attributable to the terminal voltage values of the first battery and the second battery respectively. For example, in an embodiment, the difference is determined as the difference between the average value of plural first values and the average value of plural second voltage values acquired over a time period T. Alternatively, the difference may include a difference between single first and second values acquired from a single sensing operation or cycle of the first sensing circuit.

Controlling the duty cycle of the control signal preferably involves varying the duty cycle of the control signal from the initial duty cycle characteristic to provide a new or "target" duty cycle according to the comparison of the present difference value with the previous difference value. The present difference value is preferably the latest or most recent difference value obtained from the periodical determination of the difference between the first and second values when the switch element is closed. Preferably, the previous difference value is the immediately preceding difference value obtained from the periodical determination of the difference between the first and second values when the switch element is closed. Hence, in an embodiment, the present difference value and the previous difference value are consecutively determined values.

In an embodiment, the new or "target" duty cycle is determined whenever the comparison of the present difference value and the previous difference value identifies a difference there between which exceeds a first predetermined difference value. Thus, in an embodiment, the new or "target" duty cycle is determined by obtaining an adjustment value which depends on the difference between the present difference value and the previous difference value.

In an embodiment, if difference between the present difference value and the previous difference value does not exceed a first predetermined difference value for a continuous time period, the target duty cycle may be reduced by an adjustment value at the expiry of the time period. Hence, an embodiment of the present invention includes a counter means which is cycled on each comparison of the present difference value with the previous difference value if the difference between the present difference value and the previous difference value is less than the first predetermined difference value, and a means for reducing the duty cycle of the control signal after a predetermined number of counter cycles. The counter may include an up-counter or a down-counter.

Another aspect of the present invention provides a method of controlling a switching means having a first contact for connection to a terminal of a first battery, a second contact for connection to a corresponding terminal of a second battery, and an actuating input for biasing a switch element of the switching means in a closed position, the method including:

periodically determining a first and second value attributable to terminal voltage values of the first battery and the second battery respectively;

responsive to detecting a predetermined condition of the first battery and/or the second battery, providing to the actuating input a control signal having a characteristic for biasing the switch element to the closed position;

periodically determining a difference between the first and second values when the switch element is in the closed position to obtain a sequence of difference values; and controlling the characteristic of the control signal according to a comparison of a present difference value with a previous difference value to modify the biasing of the switch element.

The present invention also provides a battery isolator unit including:

first and second input terminals, each input terminal for electrical connection to a respective positive terminal of a first and second battery;

an output for providing a control signal for biasing a switch element of a switching means having first and second contacts for respective electrical connection to corresponding terminals of the first and second batteries, the corresponding terminals including the positive terminals or negative terminals of the first and second batteries, the switch element connecting the first contact to the second contact when biased by the control signal; and means for obtaining a time-ordered sequence of voltage difference values comprising voltage difference values derived from first and second voltage values sensed at the first input terminal and the second input terminal respectively;

means for controlling the output signal to vary the biasing of the switch element according to a voltage difference value between a present voltage difference values and a previous voltage difference value from the sequence of voltage difference values.

Embodiments of the present invention may provide a battery isolator unit which requires a reduced power consumption to maintain a switch element in a closed position during normal operation by regulating the bias holding the switch element in the closed position. Furthermore, embodiments of the present invention may be able to respond to voltage disturbances across the switch element caused by vibration, movement or the like so as to increase the bias of the switch, when required, to maintain or hold the switch in the closed position.

BRIEF DESCRIPTION OF THE ACCOMPANYING DRAWINGS

The following description refers in more detail to the various features and steps of the present invention. To facilitate an understanding of the invention, reference is made in the description to the accompanying drawing where the invention is illustrated in a preferred embodiment. It is to be understood however that the invention is not limited to the preferred embodiment illustrated in the drawing.

DETAILED DESCRIPTION OF AN EMBODIMENT OF THE INVENTION

Figure 1:
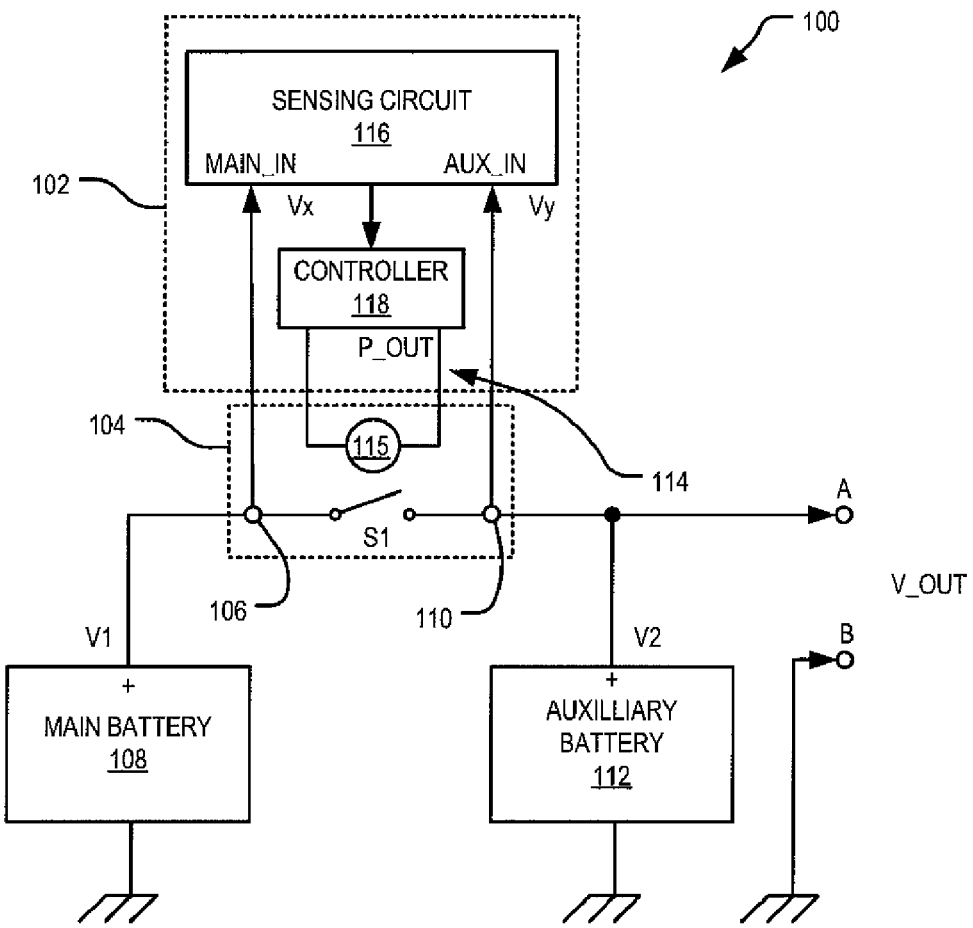
FIG. 1 is a block diagram for a circuit including a battery isolator unit according to an embodiment.

Turning initially to FIG. 1 there is shown a block diagram for an automotive electrical power supply system 100 which incorporates a battery isolator unit 102 according to an embodiment. The battery isolator unit 102 illustrated in FIG. 1 is shown as electrically connected to a switching means 104 having a first contact 106 connected to a terminal of a first battery 108 (which may be a "main" battery), a second contact 110 connected to a corresponding terminal of a second battery 112 (which may be an "auxiliary" battery).

The first battery 108 and the second battery 110 may have the same output voltage rating, and may include, for example, nominally rated 12V lead-acid batteries. It will of course be appreciated that embodiments of the present invention may be used with other battery types or nominal voltage ratings.

The battery isolator unit 102 and the switching means 104 shown in FIG. 1 may be mechanically arranged or formed as an integrated unit or module to provide a compact mechanical form. However, it is not essential that the switching means 104 be arranged with the battery isolator unit 102 as an integrated unit or module since a separate switching means 104 may be electrically connected to the battery isolator unit 102 using a suitable connection arrangement, such as by providing input terminals for connection to the contacts 106, 110 of the switching means 104. Nevertheless, is preferred that the switching means 104 be included to improve the mechanical design of the battery isolator unit 102.

The switching means 104 also includes an actuating input 114 for controlling the actuation of a switch element (S1) of the switching means 104. In this respect, the switching means 104 shown in FIG. 1 is a magnetically operated switching means such as a relay, contactor, or solenoid having a current rating which is sufficient for an expected current demand when a electrical load is placed across the output terminals (A, B) of the power supply system 100 to receive the output voltage (V_OUT). Hence, in the present example the actuating input 114 is an input to a coil 115 of the switching means 104 which is driven or energised to actuate the switch element S1. An example of a suitable switching means 104 is a "White-Rodgers type 120" solenoid having a 100 A continuous current rating, 400 A inrush current rating, and 8.1 watt continuous coil power. When the switch element S1 is actuated to the closed position the output voltage (V_OUT) is determined by the parallel combination of the first battery 108 and the second battery 112. In addition, the parallel combination of the first battery 108 and the second battery 112 also permits the first battery 108 to act as a charging source for the second battery 112 when the second battery 112 has a lower state of charge relative to the first battery 108, or vice versa.

Figure 2:
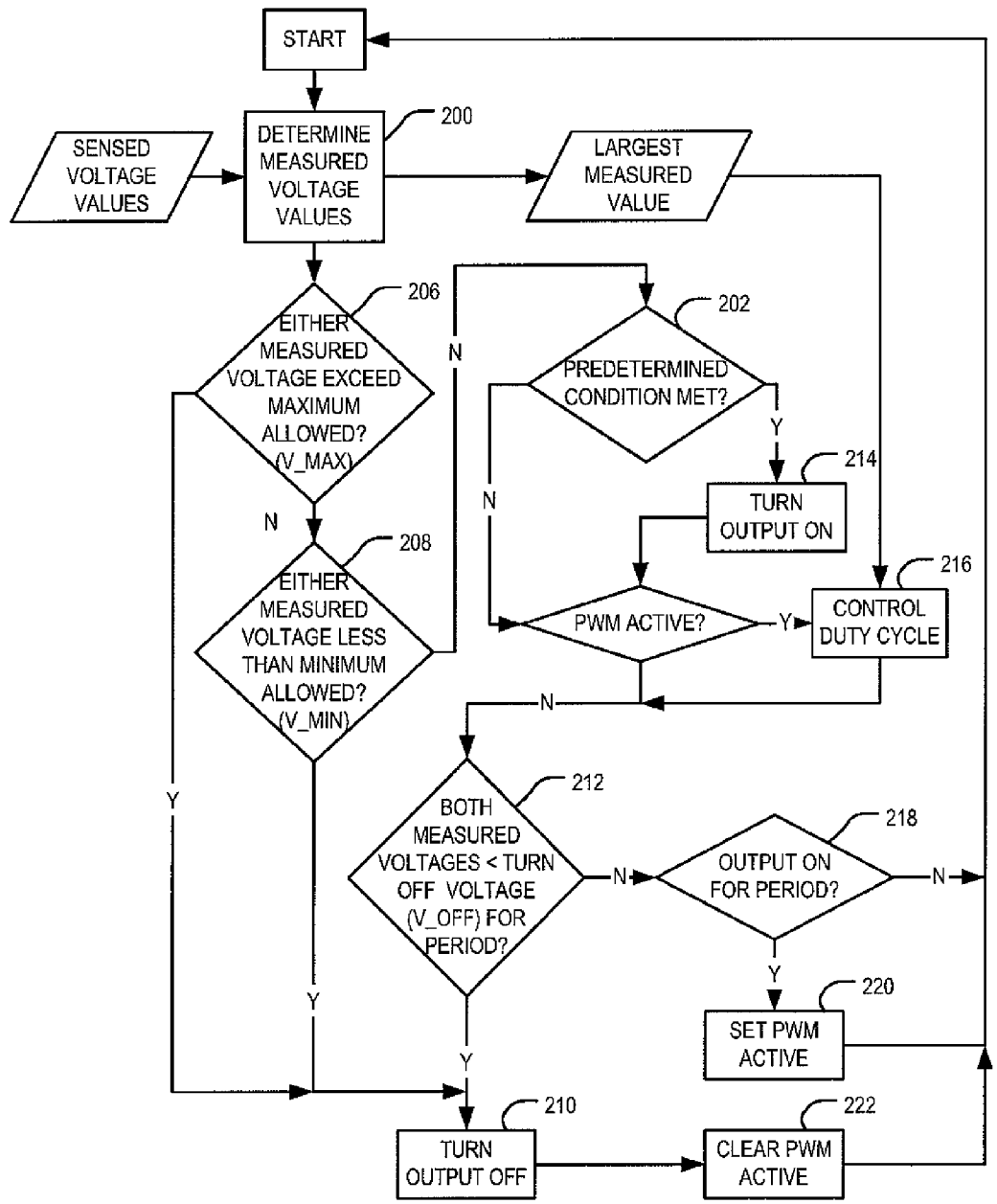
FIG. 2 is a flow diagram of an algorithm associated with the battery isolator unit shown in FIG. 1.

Referring to FIG. 1 and FIG. 2, the battery isolator unit 102 includes a sensing circuit 116 for periodically determining (at step 200) a first value and a second value attributable to the terminal voltage values V1, V2 of the first battery 108 and the second battery 112 respectively. The battery isolator unit 102 also includes a switch controller 118 responsive to detecting a predetermined condition (at step 202) of the first battery 108 and/or the second battery 112 to provide to the actuating input 114 a control signal (P_OUT) having an initial characteristic for biasing the switch element S1 to a closed position. The predetermined condition may thus be a "turn on" voltage value (V_ON).

In the present case, the control signal is a pulse width modulated (PWM) signal having a variable duty cycle. In the present case, the control signal has a signal frequency of about 20 Khz and a voltage magnitude for driving the coil 115 which depends on the higher of the two terminal voltages V1, V2. For example, in a 12 V DC electrical system, at the "turn on" terminal voltage of 13.2V DC the voltage magnitude of the control signal to drive to the coil 115 may be about 12.3 V DC. Similarly, in a 24V DC electrical system the same relative magnitude may apply so that at the "turn on" terminal voltage of 26.4V the voltage magnitude of the control signal may be about 25.5V DC.

The actual magnitude of the control signal may vary or track with varying terminal voltage. It should be noted that the above references to the voltage magnitude of the control signal are to be understood as references to the peak voltage of the control signal, as opposed to the average or RMS voltage value. As will be understood by a skilled reader, the average or RMS value will vary according to the duty cycle.

The voltage magnitude of the control signal may also depend on a voltage drop(s) across switching devices, such as transistors or the like, which may be incorporated to provide the control signal by switching the higher of the two terminal voltages V1, V2 to the coil 115 at the duty cycle.

Although the following example relates to the use of a PWM control signal, it will be understood that any other type of control signals having a variable characteristic may be used. For example, the control signal may include a variable analog signal which varies the DC output of a switching buck converter to vary the current in the coil 115 and thus modify the bias of the switch element S1.

The predetermined condition may include a condition which involves a sensed voltage value, or values, attributable to the terminal voltage of the first battery 108 and/or the second battery 112 exceeding a predetermined voltage value. In the present case, the sensed voltage values are the voltage values Vx, Vy sensed at the first contact 106 and the second contact 110, and the predetermined voltage value is a first control limit value or "turn on" voltage (V_ON) indicating that the first battery 108 and/or the second battery 113 have a charge (or "state of charge") which exceeds a predetermined amount.

The first control limit value may be set according to a required or nominal charging voltage value for the electrical system. For example, in a 12 V DC electrical system, the "turn on" voltage may be about 13.2 V DC.

When the predetermined condition is detected, and if the switch controller 118 detects that the control signal is not already active, the switch controller 118 activates or "turns on" (at step 214) the control signal with the initial duty cycle characteristic. The control signal is provided, having the initial duty cycle characteristic, as the actuating input 114 for a predetermined time period to bias the switch element S1 to a closed position. Hence, at this point the control signal is adapted to energise the coil 115 to a sufficient extent to exceed the "switching-on current" or "actuating current" requirements of the coil 115, and to thus operate or bias the switch element S1 to the close position.

In the present case, the predetermined time period is about three seconds. However, it will of course be appreciated that a different time period may be used. During the time period, the switch controller 118 will maintain the initial duty cycle at 100% irrespective of the current through the switching means or voltage drop across the contacts 106, 110. However, after the time period has expired switch controller 118 may control the duty cycle of the control signal to modify the biasing of the switch element S1 (ref. FIG. 1) using a process which will be described in more detail later.

Either before or whilst the switching element S1 is in the closed position, if the switch controller 118 detects (at step 206) that the sensed voltage values voltage on either contact 106, 110 (or either input terminal) exceeds a second control limit value (V_MAX), which is a higher value than the first control limit value, the switch controller 118 will "turn off" (at step 210) or deactivate the control signal to thereby open the switching element S1 substantially immediately to protect one or both batteries, and/or equipment connected to the output terminal A from being damaged.

The second control limit value (V_MAX) may be set as a voltage value which is outside a normal charging range for the first battery 108 and the second battery 112. For example, in a 12 V DC electrical system the second control limit value (V_MAX) may be about 15.5 V DC.

It is also possible that the switch controller 118 may detect (at step 208) when either sensed voltage value falls below a third control limit value (V_MIN), which is a lower value than the first control limit value, and which when detected by the switch controller 118 on either terminal will "turn off" (at step 210) or deactivate the control signal substantially immediately so that the switching element S1 opens substantially immediately to prevent the source of current flow from excessive discharge. In this respect, it will be appreciated that a significant voltage differential between the terminal voltage of the first battery 108 and the terminal voltage of the second battery 112 may cause an excessive current flow along the circuit path including the switch element S1.

The third control limit value (V_MIN) may be set according to a voltage value which is acceptable for starting an engine of the automotive vehicle, taking into account a time period for the terminal voltage to settle or drop once the engine has stopped. For example, in a 12 V DC electrical system the third control limit value (V_MIN) may be about 11 V DC.

Finally, if the switch controller 118 detects (at step 212) that the sensed voltage value voltage falls below a fourth control limit value (V_OFF) for a predetermined time period (for example, 10 seconds) the switch controller 118 will also "turn off" (at step 210) the control signal to open the switch element S1 and thus disconnect the terminals of the first battery 108 and the second battery 112, thus isolating the terminals of the of the first battery 108 from the output terminal A and preserve the remaining capacity in the first battery 108. In the example illustrated, whenever the control signal is "turned off" the switch controller 118 clears a "PWM Active" flag.

The fourth control limit value (V_OFF) may be set as a voltage value which is outside a normal operating voltage range of an automotive electrical system. For example, in a 12 V DC electrical system the fourth control limit value (V_OFF) may be about 12.7 V DC.

Hence, in this example, in the event that the sensed voltage values are within an acceptable range, and if the predetermined condition is met, the switch controller 118 will "turn on" or activate (at step 214) the control signal to bias the switch element S1 to the closed position with an initial duty cycle of 100%.

Once the switch element S1 is closed, and provided that the sensed voltage values stay within the acceptable range, the initial duty cycle will be maintained at 100% until it is determined (at step 218) that the control signal has been active or "turned on" for a predetermined time period to bias the switch element S1 to the closed position. After the predetermined time period has elapsed, the switch controller 118 sets (at step 220) a "PWM Active" flag to trigger the switch controller 118 to control (at step 216) the duty cycle of the control signal based on a voltage difference between consecutive measured voltage values, and/or the maximum measured voltage value.

Figure 3:
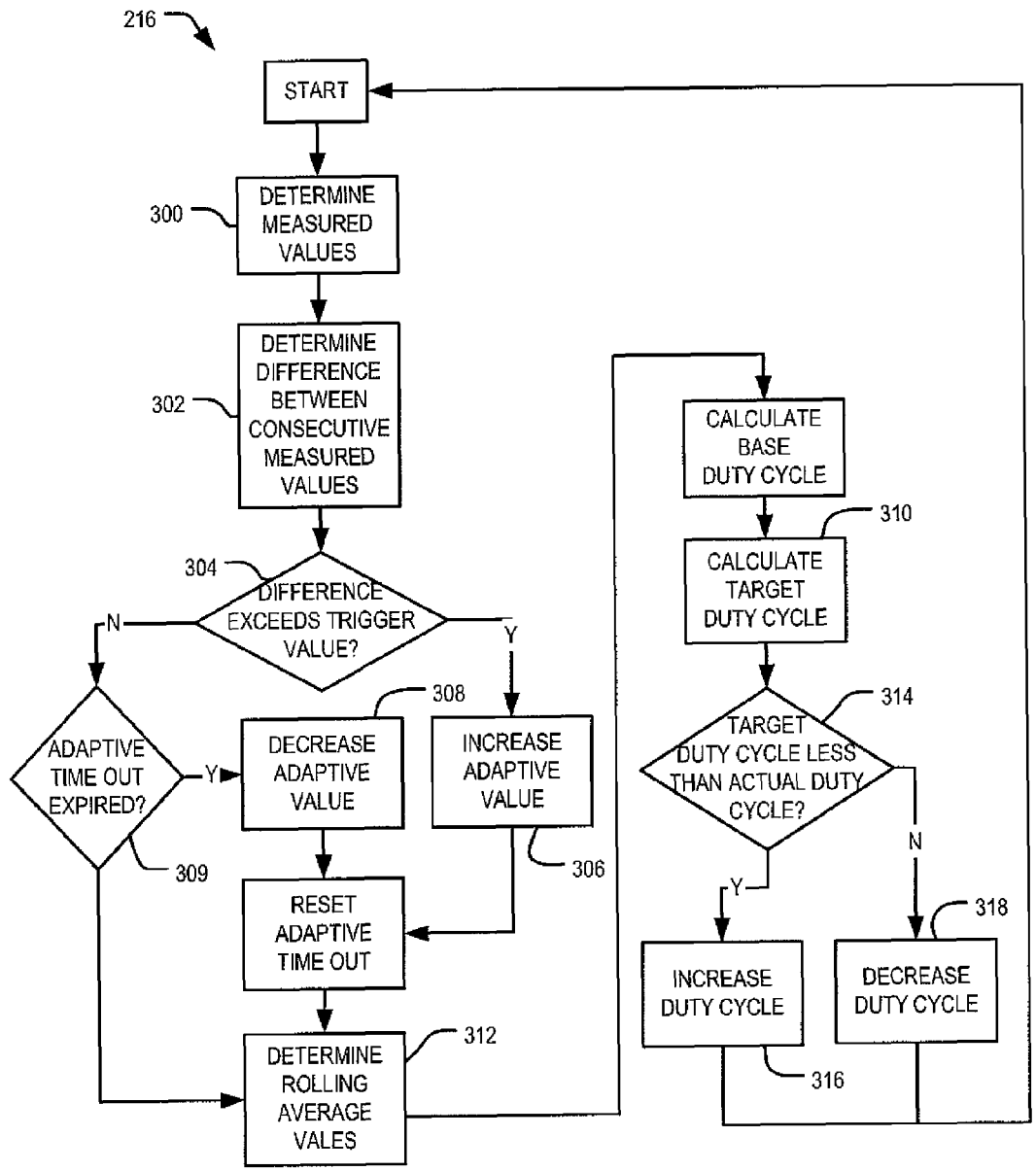
FIG. 3 is a flow diagram of an algorithm associated with the battery isolator unit shown in FIG. 1.

FIG. 3 shows an example control process 216 for controlling the duty cycle of the control signal based on a voltage difference between consecutive measured values.

With reference now to FIG. 1 and FIG. 3, whilst the switch element S1 is biased in the closed position, the sensing circuit 116 periodically determines (at step 300) the first value and the second value using sensed voltage values acquired during plural sensing cycles or operations over a time period T. The sensed voltage values are attributable to the terminal voltage values V1, V2 of the first battery 108 and the second battery 112 and in this example are voltage values Vx, Vy sensed at the first contact 106 and the second contact 110 respectively. For the remainder of this description the first value and the second value determined using sensed voltage values acquired during plural sensing cycles or operations over a time period will be referred to as the "measured voltages".

In the embodiment illustrated, determining the "measured voltages" involves acquiring six time-ordered individual voltage value samples of Vx, Vy in an interleaved manner ($Vx_1$, $Vy_1$, $Vx_2$, $Vy_2$, . . . , $Vx_6$, $Vy_6$). The lowest and highest acquired values are disregarded and the average value of the remaining four samples of the acquired voltage values is determined as the "measured voltages" $Vx_{meas}$, $Vy_{meas}$.

In the present case, the measured voltages $Vx_{meas}$, $Vy_{meas}$ are determined every 2 mS to thus provide two time ordered sequences of the measured voltages $Vx_{meas}$, $Vy_{meas}$, with each sequence including respective "present" measured voltages (having a "present" difference) and respective previous measured voltages (having a "previous" difference) for Vx and Vy. In addition, "rolling average" average values are determined from plural most recent "measured voltages", which in this example comprises two sets of sixteen values of the "measured voltages".

In the present case, the switch controller 118 determines the highest "rolling average" value of each sequence of average values. The highest "rolling average" value is then used to determine a suitable "base duty cycle" of the control signal P_OUT. By way of example, if the highest rolling average value is less than a predetermined value of voltage (for example, 11 VDC) the base duty cycle is set to 100%. However, in the event that the highest rolling average value is greater that the predetermined value of voltage, the base duty cycle is set according to a difference between the highest rolling average value and the predetermined value of voltage.

By way of example, a start or 'low voltage' base duty cycle value (for example, 50%) may be set which is an initial or first duty cycle setting used when the highest rolling average value exceeds the predetermined value of voltage. A defined step size (for example, 5%), a defined step voltage (for example, 1V) and a defined number of steps (for example, five) may also be set. Depending on the rolling average value, and starting at the "low voltage" base duty cycle value, the base duty cycle is determined using the step voltage and the number of steps, by lowering the 'low voltage' base duty cycle value by the 'step size' (for example, <11V: 100%, <12V: 50%, <13V: 45%, <14V: 40% and so on).

Having established the base duty cycle value, the switch controller 118 periodically determines a difference between the measured voltages $Vx_{meas}$, $Vy_{meas}$ to obtain a sequence of difference values including a present voltage difference value and a previous present voltage difference value. The present voltage difference value is compared to the previous present voltage difference value, which is an adjacent difference value time-wise, to obtain (at step 302) a difference value, which in this case is a difference in an average voltage value sensed across the contacts 106, 110 of the switch element S1.

If the difference in the adjacent voltage difference values is determined (at step 304) as providing an increase which is greater than a first predetermined difference value (hereinafter the "trigger value") then an adjustment or "adaptive value" is incremented or increased (at step 306). In the present example the first predetermined difference value is 110 mV. However, a higher or lower value may be used for the first predetermined difference value. The adjustment or adaptive value increment may include an absolute or relative duty cycle value. For example, the adaptive value increment may be applied as a 4% increase or increment in the duty cycle when the duty cycle is expressed on a scale of 0% to 100%.

If the difference in the adjacent voltage difference values does not exceed the trigger value for a predetermined time period (at step 309) (as may be determined by an adaptive time-out counter), the adaptive value is decremented or decreased (at step 308). It will of course be appreciated that the first predetermined difference value and the adaptive value may vary according to implementation.

A "target duty cycle" is then determined (at step 310) for the control signal based on the adaptive value by adding the adaptive value to a "base duty cycle" value determined based on the maximum "rolling average" measured voltage (at step 312). The "actual duty cycle" of the control signal may be adjusted in normal operation by comparing (at step 314) the actual duty cycle of the control signal to the target duty cycle, and periodically increasing (at step 316) or decreasing (at step 318) the actual duty cycle until it reaches the, or about the, "target duty cycle". Indeed, the actual duty cycle may be increased and decreased about the "target duty cycle" to provide an amount jitter which may contribute to a reduction in measurable EMC emissions. Increasing or decreasing the duty cycle of the control signal modifies the amount of biasing applied to the switch element S1 in the closed position by varying the energisation of the coil 115.

Reducing the duty cycle of the control signal may allow the switch element S1 to be held in the closed position with a reduced power. For example, whilst the switch element S1 is closed, and provided that the adjacent voltage difference values do not exceed the first predetermined difference or trigger value, at the expiry of predetermined time period the adaptive value may be automatically decreased or decremented (to a minimum of 0), thus reducing the target duty cycle and accordingly the actual duty cycle of the control signal, whilst maintaining the switch element S1 in the closed position.

Progressively decreasing the target duty cycle may thus allow embodiments to obtain a low or acceptable voltage difference across the switching element S1, and therefore an acceptable resistance, whilst operating the switching means at less than 100% duty cycle. Furthermore, increasing the duty cycle in response to voltage disturbances detected across the contacts 106, 110 of the switch element S1 as differences in consecutive measured voltage values may allow embodiments of the present invention to increase the biasing of the switch when the battery isolator is subject to vibration or other mechanical disturbances which may otherwise cause the switch element S1 to return to an open position.

The duty cycle of the control signal may also be varied in response to detecting other conditions. For example, if the difference in "rolling average" voltage value measurements between the contacts 106, 110 is greater than a second predetermined difference value then the "actual duty cycle" may be set to 100%. In the present example the second predetermined difference value is 0.3V. This condition may occur under high load current operation when the savings in operating temperature and power consumption may be outweighed by the importance of a stable, reliable connection. As soon as this condition is no longer present, the actual duty cycle may be adjusted (for example, incrementally) down to the "target duty cycle" via the above described duty cycle control process.

Similarly, whilst the switch element S1 is closed, the difference in "rolling average" voltage measurements between the contacts 106, 110 or input terminals (MAIN_IN, AUX_IN) is calculated and if the difference value is greater than 1V for a period of longer than 0.5 seconds a fault condition may be identified. Such a fault condition may be caused by, for example, faulty switch contacts, a failed coil 115 or a failure of control signal from the switch controller 118. If this condition is present, the coil 115 will de-energise and a visual indication may be provided to notify the user of the condition. The battery isolator unit 102 may be adapted to return to normal operation after a time period (for example, 20 seconds).

Figure 4:
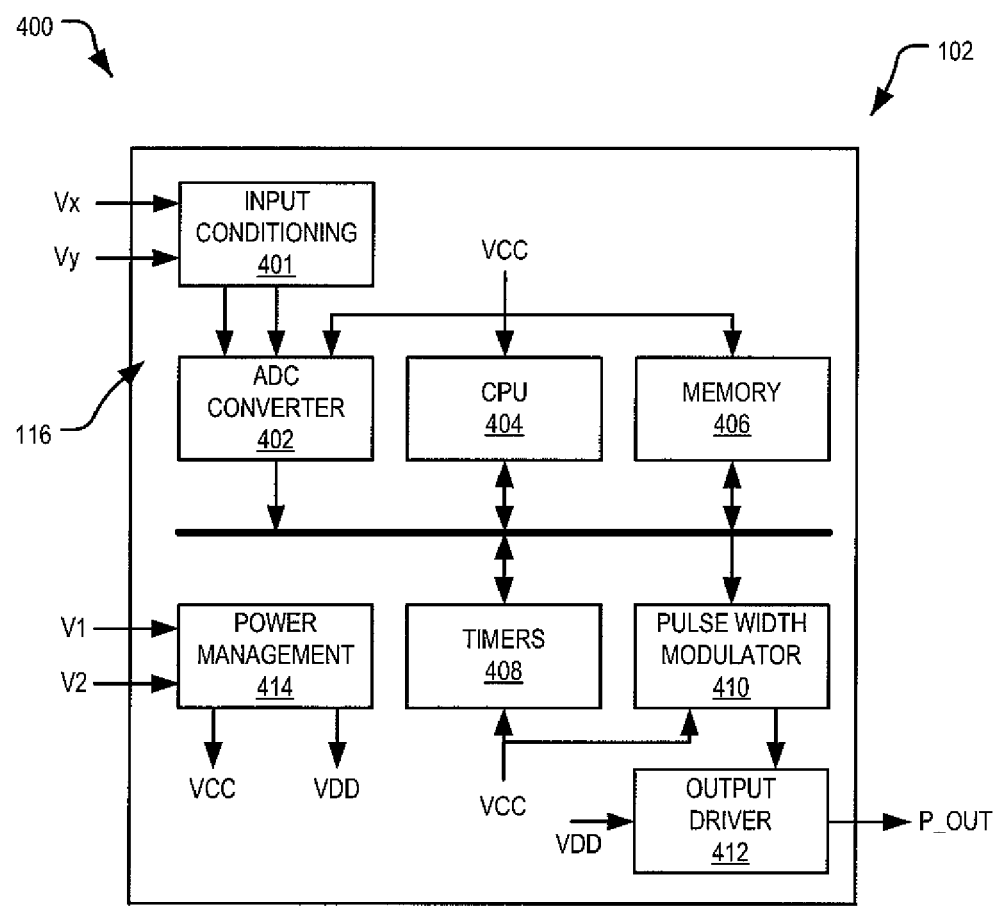
FIG. 4 is a block diagram for the battery isolator unit of FIG. 1.

Embodiments of the present invention may also provide an "override control" whereby the coil 115, and thus the switch element S1 may be actuated in response to a manual input, whilst still under the control of the switch controller 118. For example, an embodiment may include an override input which, when connected to a valid voltage for a period between 80 mS and 1 sec, will energise the coil 115 for a time period (for example, 20 seconds) before battery isolator 102 returns to normal operation. Again, the battery isolator 102 may provide a visual indication of this mode using a suitable indicator, such as a light emitting diode or the like. The sensing circuit 116 and the switch controller 118 may be implemented using any suitable functional arrangement. FIG. 4 shows a functional block diagram for an embodiment of the battery isolator unit 102 in which the sensing circuit 116 and the controller 118 are implemented using a programmed controller 400.

Figure 5:
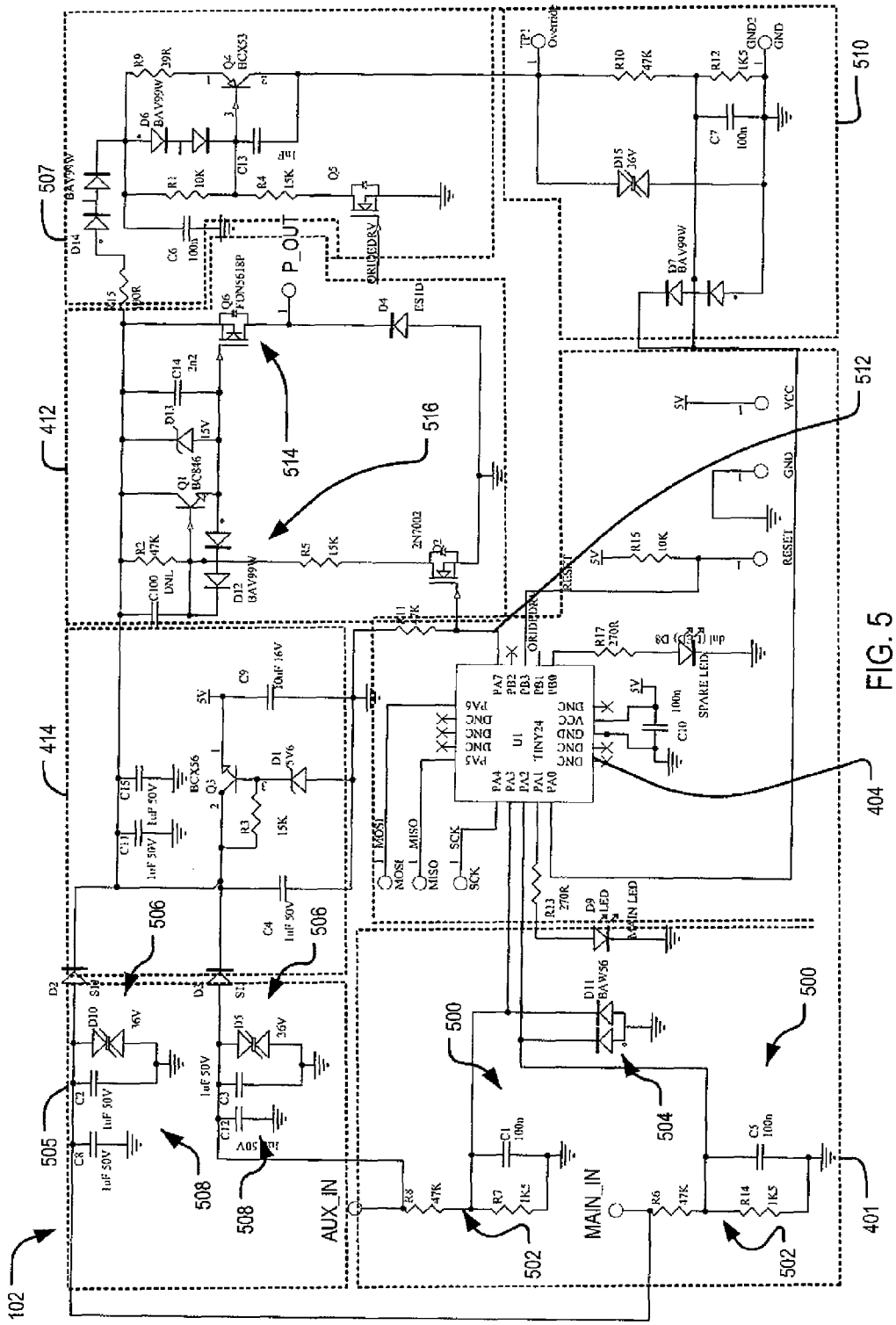
FIG. 5 is a circuit diagram for an embodiment of the battery isolator unit of FIG. 1.

The programmed controller 400 includes a central processing unit (CPU) 404 and a memory 406 including program instructions which are executable by the central processing unit (CPU) 404 to process voltage values Vx, Vy periodically sensed by ADC converter 402 via an input conditioning module 401. Referring to FIG. 4 and FIG. 5, the input conditioning module 401 may include a filter network to attenuate electrical noise and spikes which may otherwise be communicated to the inputs of the ADC converters 402. For example, the input conditioning module 401 may include bypass or smoothing capacitors 500, voltage dividers 502, and diodes 504 for protection against voltages on the input terminals (MAIN_IN, AUX_IN) outside of acceptable limits to processing device.

The central processing unit 404 periodically determines, under the control of timers 408, the first and second value attributable to the input voltages Vx, Vy and the difference between the first and second values when the switch element S1 (ref. FIG. 1) is in the closed position. The central processing unit 404 provides a low level PWM signal which is input to an output driver 412 to provide the control signal (P_OUT) having a variable duty cycle for driving the coil 115 of the switching means 104 (ref. FIG. 1).

The output driver 412 may include a level shifter (transistor), drive transistor and flywheel diode in a circuit arrangement which is responsive to the variable PWM output 512 from the CPU 404 to drive the coil 115 with the control signal (P_OUT).

In the circuit illustrated in FIG. 5, the control signal is provided by switching a voltage derived from the largest of the input voltage values sensed at the inputs AUX_IN and MAIN_IN to the P_OUT output by switching transistor 514 at the duty cycle under the control of the variable PWM output 512 and by suitably biasing the switching transistor 514 using bias circuit 516. Another suitable arrangement may include a variable output switching (buck) regulator to provide the coil 115 with a variable DC voltage. In the present example, the duty cycle of the PWM signal input to the output driver 412 depends on a comparison of the present difference value with a previous difference value, and the terminal voltages of the first 108 and/or second battery 112 respectively.

The ADC converter 402, memory 406, timers 408, and pulse width modulator 410 may be incorporated on the CPU 404 or they may be separate or discrete functional elements. Hence, the sensing circuit 116 and the switch controller 118 shown in FIG. 1 may include a processing device, such as a microprocessor or microcontroller programmed with a software implemented algorithm and having suitable inputs, such as analog-to-digital converter (ADC) inputs. An example of a suitable microcontroller is the Atmel ATtiny24. However, it will be appreciated that other microprocessors or microcontrollers may also be suitable.

Power management module 414 regulates input voltages V1 and/or V2 from the first battery 108 and the second battery 112 to provide a suitable supply voltage Vcc for the functional elements of the battery isolator 102. The power management module 414 shown in FIG. 5 includes a discrete series regulator with a zener diode as a reference and bipolar transistor as the pass component. However, it is possible that the power management module 414 may instead include an integrated circuit regulator or switching type regulator.

The power management module 414 shown in FIG. 5 also includes a input protection and filtering stage 505 which provide filtering for providing a smoothed supply to the power management module 414 and which also aids in the prevention of electrical noise and spikes from being transferred between the CPU 404 and outside environment. In the example shown in FIG. 5, the input protection and filtering stage 505 includes transient voltage suppressors 506 and ceramic capacitors 508.

The battery isolator unit 102 illustrated in FIG. 5 also includes a current limited switched voltage source 507 which is intended to drive an external indicator, which in this example is a LED indicator. This output is limited as to provide the output but also to protect itself against shorts and over current conditions which could otherwise damage devices, such as a drive transistor. A signal from the CPU 404 is provided when the current limited output is required.

An override conditioning input module 510 conditions the voltage present at the override input to provide a suitable signal to the CPU 404. The override conditioning input module 510 illustrated in FIG. 5 contains a simple voltage divider, smoothing capacitor and diodes for protection against voltages outside of acceptable limits to the CPU 404 and the current limited switched voltage source 507.

It will be appreciated that although the battery isolator unit 102 illustrated in FIG. 5 includes discrete components, other circuits may have equally been used. Finally, it is to be understood that various alterations, modifications and/or additions may be introduced into the constructions and arrangements of parts previously described without departing from the spirit or ambit of the invention.

The invention claimed is:

1. A battery isolator unit for controlling a switching means having a first contact for electrical connection to a terminal of a first battery, a second contact for electrical connection to a corresponding terminal of a second battery, and an actuating input for biasing a switch element of the switching means to a closed position to connect the first contact to the second contact, the battery isolator unit including:
   a sensing circuit for periodically determining a first and second value attributable to terminal voltage values of the first battery and the second battery respectively; and
   a switch controller responsive to detecting a predetermined condition of the first battery and/or the second battery to provide to the actuating input a control signal having a characteristic for biasing the switch element to the closed position;
   wherein the switch controller periodically determines a difference between the first and second values when the switch element is in the closed position to obtain a sequence of difference values, and controls the characteristic of the control signal according to a comparison of a present difference value with a previous difference value to modify the bias of the switch element;
   wherein the switch controller includes a processing unit for determining the first and second values by sensing N values over a time period T, the N values comprising N/2 voltage values attributable to the terminal voltage of the first battery and N/2 voltage values attributable to the terminal voltage of the second battery, and processing those values to determine the first value and the second value;
   wherein the processing unit determines the first value as a statistical value derived from at least some of the N/2 sensed values attributable to the terminal voltage of the first battery and determines the second value as a statistical value derived from at least some of the N/2 sensed values attributable to the terminal voltage of the second battery; and
   wherein the processing unit determines the first value as the statistical mean or average value of voltage values attributable to the terminal voltage of the first battery acquired over the time period T, and the second value as the statistical mean or average value of voltage values attributable to the terminal voltage of the second battery acquired over the same time period T.

2. A battery isolator unit according to claim 1 further including the switching means.

3. A battery isolator unit according to claim 1 wherein the first and the second values are derived from voltage values sensed at the first contact and the second contact respectively, or at respective input terminals of the battery isolator unit in communication with the first contact and the second contact respectively.

4. A battery isolator unit according to claim 3 wherein the sensing circuit includes an analog-to-digital converter (ADC) adapted to convert input voltage values attributable to the terminal voltage of the first battery and the terminal voltage of the second battery respectively to provide the first and second values as scaled data values.

5. A battery isolator unit according to claim 4 wherein the first and second values are expressed as an n-bit code.

6. A battery isolator unit according to claim 1 wherein the first and second values are determined by sensing the terminal voltage values of the first battery and the second battery respectively.

7. A battery isolator unit according to claim 6 wherein the first and second values are indicative of the terminal voltage of the first battery and the terminal voltage of the second battery respectively.

8. A battery isolator unit according to claim 1, wherein the processing unit senses the N values over a time period T using a sensing process which acquires plural first voltage values and plural second voltage values over the time period T, said sensing process including plural sensing operations or cycles, each sensing operation or cycle consecutively sensing the first voltage values and the second voltage values.

9. A battery isolator unit according to claim 8 wherein the plural sensing operations or cycles provide a time-ordered sequence of plural sensed voltages comprising the first voltage values and the second voltage values.

10. A battery isolator unit according to claim 1 wherein the switch controller includes a programmed controller programmed with a set of program instructions in the form of a computer program.

11. A battery isolator unit according to claim 1 wherein the predetermined condition of the first battery includes a condition indicating that the terminal voltage of the first battery exceeds a predetermined voltage value.

12. A battery isolator unit according to claim 11 wherein the predetermined condition is detected by processing the first value, or a time-ordered set of the first values.

13. A battery isolator unit according to claim 11 wherein the predetermined condition is detected using a different value to the first value, said different value being attributable to the terminal voltage of the first battery.

14. A battery isolator unit according to claim 11 wherein the predetermined value of the terminal voltage of the first battery includes a value of voltage indicative of a state of charge level of the first battery.

15. A battery isolator unit according to claim 11 wherein the predetermined condition of the second battery includes a condition indicating that the terminal voltage of the second battery exceeds a predetermined voltage value.

16. A battery isolator unit according to claim 15 wherein the predetermined condition of the second battery is the same predetermined condition as the predetermined condition of the first battery.

17. A battery isolator unit according to claim 15 wherein predetermined condition of the second battery is a different predetermined condition to the predetermined condition of the first battery.

18. A battery isolator unit according to claim 1 wherein the control signal is a pulse width modulated (PWM) signal.

19. A battery isolator unit according to claim 18 wherein the characteristic of the control signal is a duty-cycle characteristic.

20. A battery isolator unit according to claim 1 wherein determining the difference between the first and second values includes determining a difference between statistically derived first and second values determined for a set of N sensed values attributable to the terminal voltage values of the first battery and the second battery respectively.

21. A battery isolator unit according to claim 20 wherein the difference is determined as the difference between the average value of plural first values and the average value of plural second voltage values acquired over a time period T.

22. A battery isolator unit according claim 1 wherein the present difference value and the previous difference value are consecutively determined values.

23. A battery isolator unit for controlling a switching means having a first contact for electrical connection to a terminal of a first battery, a second contact for electrical connection to a corresponding terminal of a second battery, and an actuating input for biasing a switch element of the switching means to a closed position to connect the first contact to the second contact, the battery isolator unit including:
   a sensing circuit for periodically determining a first and second value attributable to terminal voltage values of the first battery and the second battery respectively; and
   a switch controller responsive to detecting a predetermined condition of the first battery and/or the second battery to provide to the actuating input a control signal having a characteristic for biasing the switch element to the closed position;
   wherein the switch controller periodically determines a difference between the first and second values when the switch element is in the closed position to obtain a sequence of difference values, and controls the characteristic of the control signal according to a comparison of a present difference value with a previous difference value to modify the bias of the switch element;
   wherein the control signal is a pulse width modulated (PWM) signal;
   wherein the characteristic of the control signal is a duty-cycle characteristic; and
   wherein the control signal has an initial duty cycle characteristic including a fixed value or constant duty cycle having a predetermined duration T1 for closing the switch element.

24. A battery isolator unit according to claim 23 wherein the fixed value or constant duty cycle is a duty cycle of 100%.

25. A battery isolator unit according to claim 23 wherein the initial duty characteristic depends on the first and/or second value.

26. A battery isolator unit according to claim 23 wherein the initial duty cycle characteristic includes a time varying duty cycle which provides an initial duty cycle value of 100% for the predetermined duration T1, and which then decreases over a second time period T2 to a duty cycle value which depends on the first value and/or the second value.

27. A battery isolator unit according to claim 23 wherein controlling the duty cycle of the control signal includes varying the duty cycle of the control signal from the initial duty cycle characteristic to provide a new or target duty cycle according to the comparison of the present difference value with the previous difference value.

* * * * *